Aug. 21, 1928.

B. C. COONS 1,681,467

MACHINE FOR REMOVING SEED CELLS FROM FRUIT SUCH AS APPLES

Filed May 1, 1925   5 Sheets-Sheet 1

INVENTOR.
Burton C. Coons

BY Davis & Timms his ATTORNEYS.

Aug. 21, 1928.

B. C. COONS 1,681,467

MACHINE FOR REMOVING SEED CELLS FROM FRUIT SUCH AS APPLES

Filed May 1, 1925     5 Sheets-Sheet 2

INVENTOR.
Burton C. Coons.

BY Davis & Timms his ATTORNEYS.

Aug. 21, 1928.

B. C. COONS 1,681,467

MACHINE FOR REMOVING SEED CELLS FROM FRUIT SUCH AS APPLES

Filed May 1, 1925 5 Sheets-Sheet 3

Fig.3

INVENTOR.
Burton C. Coons,
BY Davis & Timms
his ATTORNEYS.

Aug. 21, 1928.

B. C. COONS 1,681,467

MACHINE FOR REMOVING SEED CELLS FROM FRUIT SUCH AS APPLES

Filed May 1, 1925    5 Sheets-Sheet 4

INVENTOR.
Burton C. Coons.

BY Davis & Simms his ATTORNEYS.

Patented Aug. 21, 1928.

1,681,467

UNITED STATES PATENT OFFICE.

BURTON C. COONS, OF ROCHESTER, NEW YORK, ASSIGNOR TO COONS MANUFACTURING COMPANY, INC., OF ROCHESTER, NEW YORK, A CORPORATION OF NEW YORK.

MACHINE FOR REMOVING SEED CELLS FROM FRUIT SUCH AS APPLES.

Application filed May 1, 1925. Serial No. 27,138.

The present invention relates to machines for removing seed cells from fruit such as apples. An object of the invention is to provide an improved construction in which an apple and seed cell removing knife are turned relatively for effecting the removal of the seed cell from the apple, provision being made whereby during such turning a centered relation between the apple and the seed cell removing knife is maintained, notwithstanding the size of apple, this centered relation being such that the seed cell removing knife not only operates at the center of a core but also at a point midway between the ends of the core. Another object of the invention is to provide a construction in which the seed cell removing knife moves outwardly with reference to the core of the fruit a distance proportional to the diameter of the fruit being seed celled, so that the knife removes a larger amount on the large apples or fruit than upon the smaller apples or fruit. A further object of the invention is to provide a machine of the class described in which a rotary seed cell removing knife is moved from its axis of rotation a distance proportional to the size of an apple held in cooperative relation to such knife by centering and holding jaws. Still another object of the invention is to provide an improved mounting for a rotary seed cell removing knife which will permit said knife to move outwardly with reference to said rotation to hold it against any free or wobbling movement. A still further object of the invention is to provide a novel centering and holding means which will present the fruit in properly centered relation to the seed cell removing knife. Still another and further object of the invention is to associate with the holding means a means which will increase the holding properties of said holding means while the seed cell removing knife is operating upon the fruit. Still another and further object of the invention is to associate with the seed cell removing apparatus a slicing means which will receive the fruit from the centering and holding means. Still another object of the invention is to provide a guiding means which will receive the fruit from the centering and holding means after such fruit has been seed celled by the seed cell removing knife, said guiding means conducting the fruit to a slicing means. Still another and further object of the invention is to provide a movably mounted guide member which will align with the fruit being operated upon by the seed cell removing knife, so that after the seed cell is removed, the fruit may be carried to the guide by the centering and holding means.

To these and other ends, the invention consists of certain parts and combinations of parts, all of which will be hereinafter described, the novel features being pointed out in the appended claims.

The seed cell corer of which there may be any number, two being shown, in this instance, comprises a curved knife 1 removably secured by screws 2 to a support 3 which is pivoted at 4 to a rotary shaft 5, so that the knife in addition to rotating about a suitable axis may swing outwardly transversely of said axis to cut out seed cells of different sizes. In this instance, each shaft 5 has a bevelled pinion 6 at its upper end, meshing with a bevelled gear 7 on a shaft 8 which carries two of said bevelled gears 7 so as to turn both seed cell removers. A pulley 9 is mounted on the shaft 8 so as to drive such shaft.

In order to control the swinging movement of the cutter 1 about the axis of turning 4, said cutter holder 3 has a laterally extending portion 10 carrying two rollers 11 and 12. These rollers cooperate one with the plate 13 and the other with the plate 14, these two plates being spaced apart to receive the rollers between them and being supported upon rods 15 which extend through the uppermost plate and are guided in the top frame 16 in which the shafts 5 and 8 turn. These two plates reduce to a minimum any loose play in the knife, and, in addition they provide yielding means to control the position of the knife as will be hereinafter set forth. Means is provided for presenting the fruit to the seed cell removing knives, in order that the knives may remove the seed cell. This means, in this instance, also acts to center the fruit with reference to the seed cell removing knives. By centering is meant that the fruit is centered either with reference to an axis coincident with the core of the fruit, or with reference to the middle or center of said axis, or both. This presenting and also centering means, in this instance, embodies two cup shaped or cone shaped jaws $16^a$, which, in this instance, are rigidly mounted on two L-shaped arms 17, pivotally supported at 18 on the carrier 19 which supports two pairs of said jaws $16^a$ and is guided vertically on a guide post 20. These jaws are normally held toward each other by springs 21 and 22, at 23 and 24, respectively, to the arms 17 and at 25 and 26 to the carriage 19. The arms 17 connect so that as one moves outwardly or vice versa the other moves in the opposite direction. In this instance, one arm has a roller 27 which works in a slotted way 28 on the other. It is preferred to secure the spring 22 nearer to the pivotal axis 18 than the spring 21 is secured to the axis 18. With this arrangement, it is possible to take up for wear on the roller 27 and, at the same time, the provision of two springs instead of one gives the proper tension on the jaws without making the jaw movement too stiff, when the jaws are moved toward their extreme outward positions.

The size of the seed cell is to a certain extent proportional to the size of the apple, that is, the larger the apple the larger the seed cell and vice versa. In order that the amount of seed cell removed from the apple will be proportional to its size adjustable projections, in the form of screws 29 are mounted on the jaws to swing outwardly therewith so that the bigger the apple, the further from the center of the apple will be located the adjustable screws 29. The screw 29 being adjustable, it is possible to vary the amount of the cut made by the knife for any given size of apple. In this way, while the knife will move different distances for different sizes of apples, the amount removed from the different sizes may be increased or decreased. These screws cooperate with inclined surfaces 30 arranged on the lower plates 13 and extending in opposite directions. As the jaws move upwardly with an apple therein these adjustable screws 29 engage the inclined surfaces 30, and, as a consequence, move the plates 13 and 14 upwardly against the actions of the springs 32. This causes the knife 1 to be thrown outwardly with reference to its axis or rotation and the amount of this outward throwing is dependent on the size of the apple, due to the fact that the projections 29 move outwardly a greater extent with the larger apple than with the smaller apple and move the plates 13 and 14 upwardly a greater distance. The plate 13 effects the outward movement of the knife while the plate 14, while cooperating with the roller 12, limits such outward movement and returns knife to original position.

It is desirable, although not necessary, while a seed cell corer is operating upon an apple to impose upon said apple a greater pressure or holding force and, with this object in view, there is employed a yielding head or stop 33, carrying two guide plungers 34 surrounded by helical springs 35 and supported on an arm 36, which is extended laterally from the upper end of the guide post 20, being adjustably secured thereto by bolts 37. Two of these arms are provided one for each pair of jaws and extending in the opposite direction from the guide post 20. As each set of jaws moves upwardly with an apple clamped therein, the opposite ends $33^a$ of the member 33 engage the two arms 38 of the two jaws and impose additional yielding pressure upon the fruit held by the jaws so that during the seed cell coring the fruit is additionally held so that it is not liable to be displaced in the jaws. It is apparent, however, that the pressure on the fruit is increased without the provision of the springs 35, due to the fact that when the adjustable abutments 29 engage the inclined surfaces 30, the springs, which acts upon the seed celling knife, are imposed also upon the holding and centering jaws, and, at the same time, the back pressure opposing the cutting movement of the knife is transmitted to the holding and centering jaws.

Any suitable means may be employed for feeding the fruit to the centering and holding jaws. In this instance, an endless carrier is provided preferably in the form of a chain 39 having a plurality of fruit engaging devices, such as pins or projections 40 extending therefrom on which the fruit which has first preferably been cored and pared is placed by hand, the pins 40 being introduced into the core openings of the fruit. This endless belt or chain may be supported on the main frame 41 of the machine and to this end the machine has a sprocket 42 journaled thereon and a smaller sprocket 43 supported thereon, the sprocket 43 being supported to one side of the frame 41 and to this end being mounted on an arm 44 projecting laterally from the frame, said arm having a trackway 45 through which the upper lap of the chain passes with the pins 40 projecting upwardly therefrom. This is the feeding point of the endless carrier or the place where the operator places the fruit on the projections or forks 40. The endless carrier is moved by a step by step movement to present the pins to the centering and holding jaws.

Any suitable mechanism may be employed for imparting to the endless carrier this step by step movement. In this instance, the shaft 46 on which the pulley 42 is mounted has also a bevelled gear 47 thereon which is driven by a mutilated bevelled gear 48. On the shaft 46 is also an arm 49 which cooperates with a segmental plate 50 on the shaft 51 on which the bevelled gear 48 is mounted. By this arrangement the mutilated gear imparts to the gear 47 a turning movement sufficient to present two of the pins 40 to the holding and centering cups and thereafter the part 50 cooperates with the part 49 to hold the shaft 46 against turning while the apples are being removed from the pins 40 by the centering and holding cups. The shaft 51 has a bevelled gear 52 thereon which meshes with the bevelled gear 53 on a shaft 54. The latter has a bevelled gear 55 meshing with a bevelled gear 56 on a shaft 57 which carries a sprocket wheel 58 connecting by a chain 59 to the shaft 8 which is driven by the pulley 9.

Movement of both pair of jaws simultaneously from the endless carrier to the seed cell corers and vice versa may be effected in any suitable manner. In this instance, the shaft 57 has a crank portion 60 which through a pitman rod 61 connects at 62 with a rocking member 63. This rocking member 63 carries a weight 64 adjustable at 65 toward and from the center 66 of the rocking member. The rocking member is bifurcated to provide two arms 67 which lie on opposite sides of a swinging member 68, the latter being adjustable between the two arms 67 by means of screws 69 and the arms 67 being slightly yieldable. The member 68 connects by links 70 pivoted thereto at 71 with the frame 19 on which the two holding and centering jaws are mounted.

With the object in view of opening the jaws as they move away from the seed cell removing knife in order to discharge the seed celled apples and, at the same time, to permit the jaws to engage with and remove other apples from the endless conveyor, there may be provided jaw operating means consisting, in this instance, of two members for each pair of jaws 72 pivoted at 73 and operating toward each other by springs 74. These members 72 have track surfaces 75 on the outer sides thereof and track surfaces 76 on the inner sides thereof. Rollers 77 projected rearwardly from the arms of the centering and holding jaws 16$^a$ cooperate with these tracks and effect the movement of the jaws toward and from each other. On the downward movement of the jaws 16$^a$, these rollers 77 cooperate with the outer faces of the operating members or tracks 75 causing the jaws 16$^a$ to separate until the lower ends of the tracks 75 are reached, when the jaws spring suddenly toward each other under the actions of the springs 21 and 22 grasping the fruit on the adjacent fork or pins 40 and centering the same. Almost immediately the jaws move upwardly and the rollers travel on the inner tracks 76, while the jaws are closed displacing the members 72 outwardly against the actions of the spring 74 until the upper ends of the track 76 are reached when the members 72 move toward each other under the action of the spring 74 so that the tracks 75 will again cooperate with the rollers 77 upon the descent of the jaws.

The fruit after being seed celled may be delivered to a slicing mechanism. This slicing mechanism embodies, in this instance, two slicing devices 78. Preferably each of these slicing devices embodies a plurality of radially arranged blades. Both of them are mounted on a frame 79 which is mounted to oscillate or rock about an axis 80 on brackets 81. From the center of each slicing device a guide projects. This guide has an inner portion 82 perpendicular to the base of the slicing device, an inclined intermediate portion 83 and an end portion 84 at a slight angle to the inclined portion 83. When the slicing devices are swung on their axis 80, the two end portions 84 of the guides will align vertically with the fruit being seed celled, in the two pairs of holding jaws, so that as the fruit after being seed celled moves downwardly, it will be fitted on the ends 84 of the guides. About this time, the jaws 16$^a$ separate, thus freeing the fruit and permitting the latter to move down the inclined portions 83 to and on the portions 82.

Figure 1:
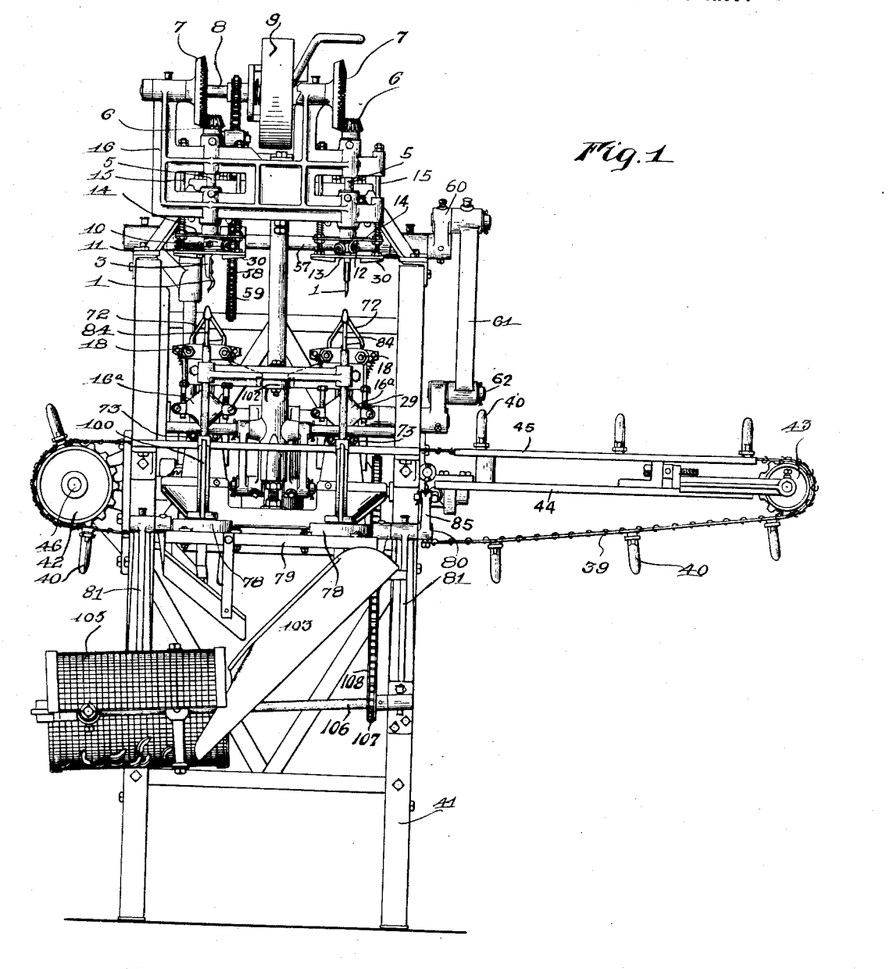
Fig. 1 shows the machine in front elevation with the centering and holding jaws in position to remove the fruit from the endless carrier.
Figure 2:
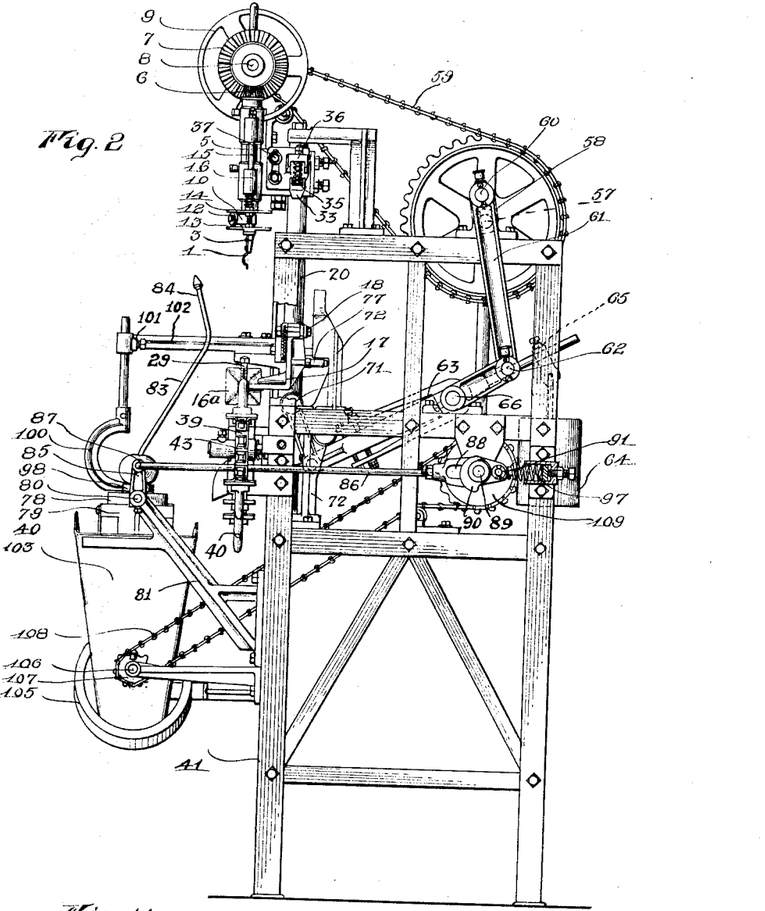
Fig. 2 is an end view of the machine showing the parts in the positions illustrated in Fig. 1.
Figure 3:
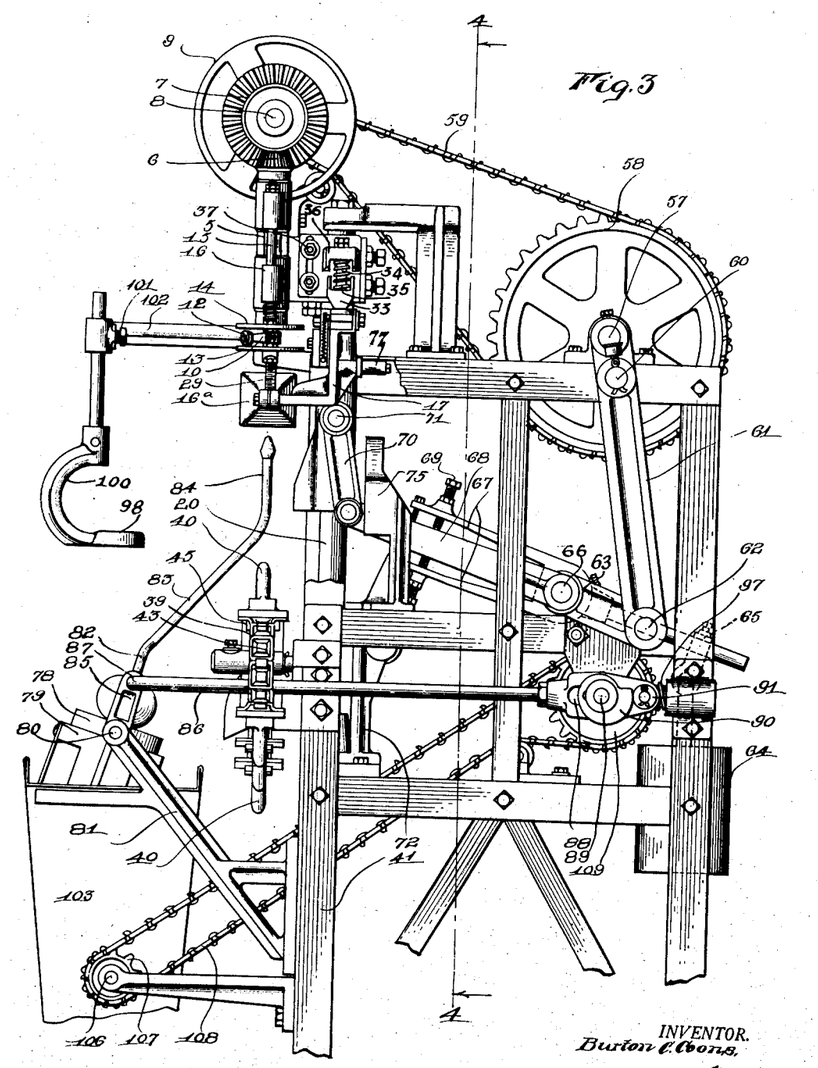
Fig. 3 is an enlarged end view similar to that shown in Fig. 2, illustrating the machine while the seed cells are being removed from the apples and the guides of the slicing means are positioned for receiving the apples from the centering and holding jaws.
Figures 4, 12:
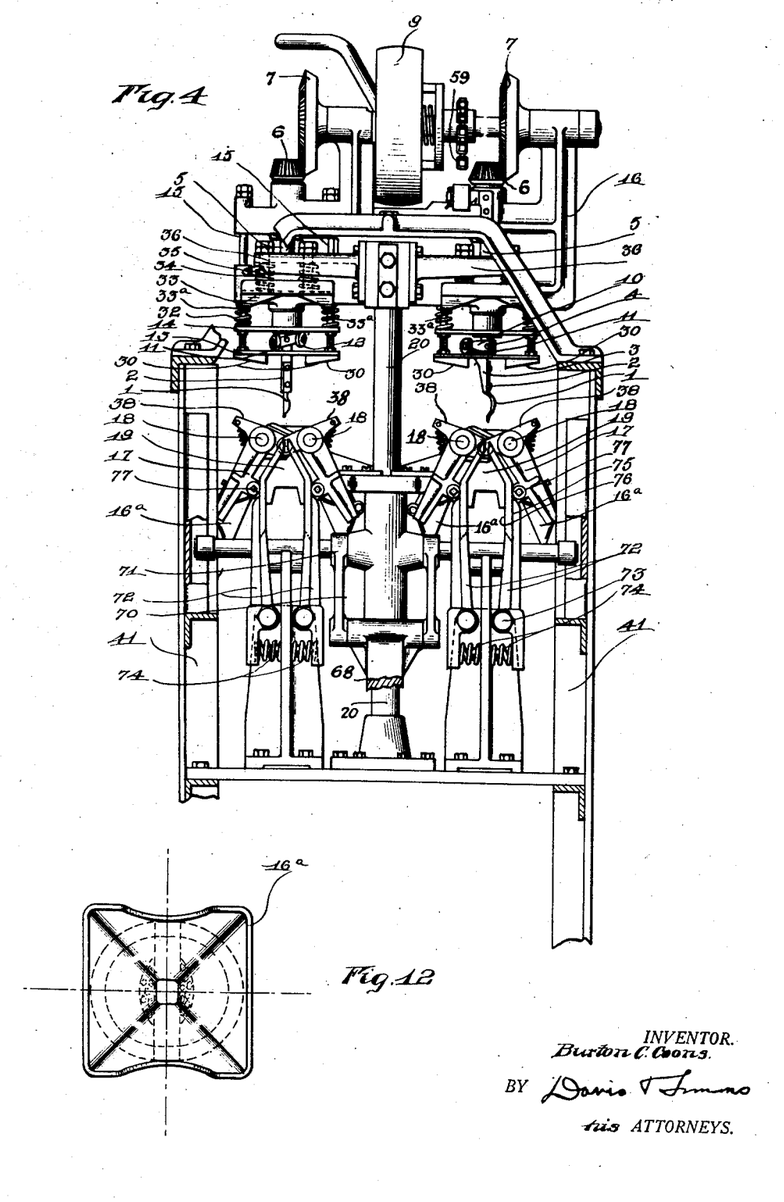
Fig. 4 is a section on the line 4—4, Fig. 3, showing the centering and holding jaws as they are being lowered away from the seed cell removing knives.
Fig. 12 shows diagrammatically the manner in which the centering and holding jaws center the fruit irrespective of its size with reference to a seed cell removing device.
Figures 5, 9:
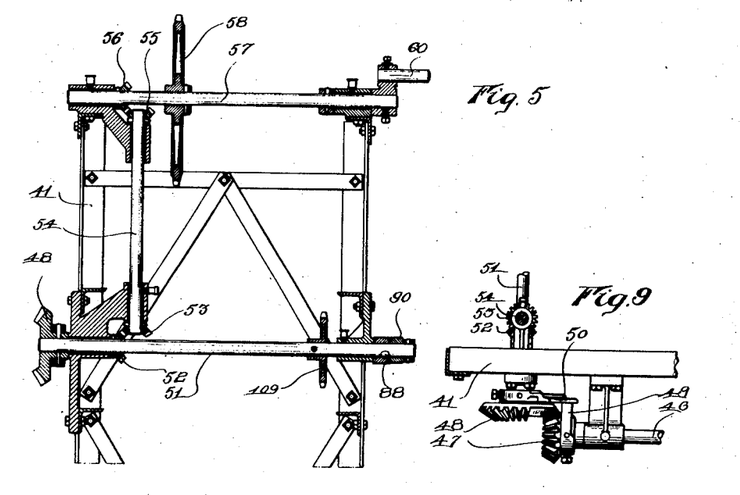
Fig. 5 is a sectional view showing some of the driving parts.
Fig. 8 and Fig. 9 are detail views of the indexing means for the endless carrier from which the apples are removed by the centering and holding jaws.
Figure 6:
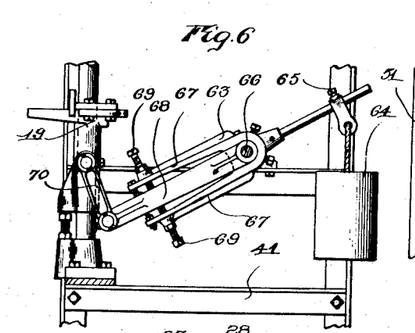
Fig. 6 is a detail view of the operating mechanism for the centering and holding jaws.
Figure 7:
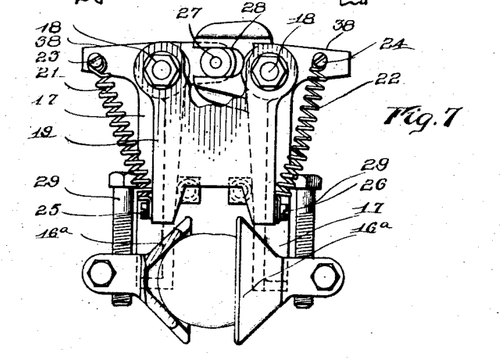
Fig. 7 is a detail view of a pair of the centering and holding jaws.
Figure 8:
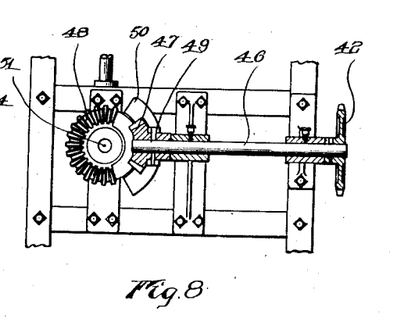
Figure 10:
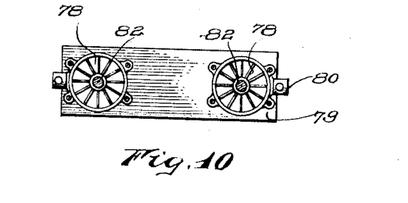
Fig. 10 is a plan view of the slicing devices.
Figure 11:
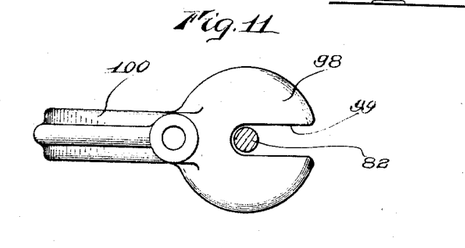
Fig. 11 is a detail view of one of the pressure devices.

The mechanism for tilting or moving the slicing devices as well as the guide rods projecting therefrom may be of any suitable form. In this instance, it comprises an arm 85 projected laterally from the shaft 80 of the slicing devices and having a pitman 86 pivoted thereto at 87. The other end of this pitman is slotted at 88 and has a shaft 89 extending therethrough. On this shaft is a cam 90 which cooperates with a roller 91 on the pitman 86 to press said pitman in one direction against the action of a spring 97, and thereby swinging the upper ends 84 of the guides in line with the apples in the cupped centering and holding jaws as shown in Fig. 3. After the jaws have been opened the apples drop therefrom onto the guide rods 84 which are thereafter swung outwardly to the position shown in Fig. 2, the apples passing down the rods to the slicing devices.

After the apples have dropped onto the slicing devices pressure devices may be brought into action to force the apples through the slicing devices. These pressure devices comprise, in this instance, heads 98 formed with slots 99 and carried by U shaped members 100 which are adjustable at 101 in a bracket arm 102 which is projected forwardly from the carriage 19. When in their upper positions, the pressure devices 98 are free from the guide rods, but after the guide rods have been supplied with apples and tilted outwardly, the pressure devices 98 slide laterally onto the rods above the apples, and force the apples through the slicing devices. As the pressure devices are carried by the carriage or slide 19 which also carries the holding and centering jaws, they move with the jaws up and down.

After the apples are forced through the slicing devices they fall upon a chute or inclined table 103. From the chute or table 103 the sliced apples are delivered into a rotary reticulated open ended drum 105. This drum agitates the slices, causes the small pieces of seed cell to be separated from the slices and discharged through the side walls of the drum and the slices to be discharged at the lowermost end of the drum, or that end opposite the one in which the slices are delivered by the chute 103. The drum 105 may be rotated in any suitable manner. In this instance, a shaft 106 carries a sprocket wheel 107, which by a sprocket chain 108 connects with a sprocket wheel 109 on the shaft from which the cam 96 is mounted.

The operation of the invention will be understood from the foregoing, but it may be summarized as follows: An operative stands to one side of the machine and places on the fruit holding devices 40 cored and pared fruit. The fruit on these fruit holding devices 40 is advanced so as to be presented one to each one of the pair of fruit holding jaws 16. These jaws clamp the fruit on opposite sides and withdrawn it from the fruit holding devices 40. As it is withdrawn the jaws tend to center the fruit both in the direction of its core and also at a point midway between the core. This is due to the cup shaped jaws. The jaws then continue their movements upwardly toward the seed cell removing knives 1 which are rotating. These knives enter the core holes of the fruit and the projections 19 engage the bevelled pieces 30 on the yielding plates 13 and cause the knives to swing outwardly when amounts proportional to the sizes of the apples in the jaws to remove the seed cells. About the time the jaws reach the uppermost positions, the yielding devices 33 cooperate with the jaws to impose greater holding force on the fruit so that the latter will not become loose while the seed cell removers are operating thereon. After the seed cells have been removed the jaws 16 move away from the seed cell knives which return to their centered positions and the seed celled apples are placed upon the upper ends of the guides 84, these guides having been swung under the jaws 16 so that the jaws carry the apples onto the knives and then release the apples to permit the apples to fall by gravity to the slicing device 78 where they are forced through by the pressure devices 98 dropping on the chute 103 which conducts them to the drum 105.

What I claim as my invention and desire to secure by Letters Patent is:

1. The combination with a rotary seed cell removing knife movable inwardly and outwardly with reference to the axis of turning of the knife, of centering and holding jaws movable toward and from said seed cell removing knife in line with the axis of turning of said knife, and an endless carrier having pins thereon, and means for moving said carrier step by step to cause said pins to align with the axis of turning of the seed cell removing device, so that the centering and holding jaws may move from the pins to the seed cell removing knife and vice versa.

2. The combination with a rotary seed cell removing knife movable inwardly and outwardly with reference to the axis of turning of the knife, of centering and holding jaws movable toward and from said seed cell removing knife in line with the axis of turning of said knife, and an endless carrier having pins thereon, and means for moving said carrier step by step to cause said pins to align with the axis of turning of the seed cell removing device, so that the centering and holding jaws may move from the pins to the seed cell removing knife and vice versa, and means for cooperating with said jaws during their movement to effect the opening of the jaws for release of the seed celled fruit and for engagement with the fruit on the pins.

3. The combination with a rotary seed cell removing knife movable inwardly and outwardly with reference to the axis of turning of the knife, of mechanism for holding the apple in cooperative relation with the seed cell removing knife during such seed celling, and means controlling the position of the seed cell removing knife with reference to the axis of the apple, said means being controlled by the size of the apple in the holding mechanism and said means being adjustable so that the amount of movement of the knife may be varied for all sizes of apples.

4. The combination with a rotary shaft, a seed cell removing knife turned by the shaft and mounted to swing about an axis transversely to such shaft, two yieldingly mounted plates held in fixed relation to each other, two rollers carried by the knife, one cooperating with one plate and the other with the other plate, mechanism for holding an apple in cooperative relation with the seed cell removing device during seed celling, and means acting to shift the yieldingly mounted plates to cause the knife to move outwardly.

5. The combination with a rotary shaft, of a seed cell removing knife movable inwardly and outwardly with reference to the axis of rotation of the shaft, yieldingly mounted means connected with said seed cell removing knife to hold the latter in its inner position and yielding to effect the movement of the knife outwardly, and mechanism for holding an apple in cooperative relation with the seed cell removing knife during the seed celling having means acting to shift the yieldingly mounted means to cause the knife to move outwardly.

6. The combination with a rotary shaft, of a seed cell removing knife movable inwardly and outwardly with reference to the axis of rotation of the shaft, yieldingly mounted means connected with said seed cell removing knife to hold the latter in its inner position and yielding to effect the movement of the knife outwardly and mechanism for holding an apple in cooperative relation with the seed cell removing knife during the seed celling having means acting to shift the yieldingly mounted means to cause the knife to move outwardly an amount proportional to the size of an apple in the holding mechanism.

7. The combination with a rotary shaft, of a seed cell removing knife turned by the shaft and mounted to swing inwardly and outwardly with reference to the longitudinal axis of the shaft, yielding means moving the knife to its inner position and yielding to cause the knife to swing outwardly, and two centering and holding jaws for holding an apple in cooperative relation with the seed cell removing knife during seed celling, said jaws having two abutments which cooperate with the yielding means in order to move the knife outwardly an amount proportional to the size of the apple in the centering and holding jaws.

8. The combination with a rotary seed cell removing device, of centering and holding means for the fruit during the seed celling thereof engaging the fruit before the seed celling device is in engagement with the fruit, and means for imposing additional pressure on the fruit through the holding means after the seed cell removing device enters into cooperation with the same.

9. The combination with a seed cell removing device, of centering and holding jaws for the fruit during the seed celling thereof, and means for increasing the pressure of the jaws upon said fruit during the seed celling.

10. The combination with a seed cell removing device, of centering and holding jaws for the fruit during the seed celling thereof, and means for increasing the pressure of the jaws upon said fruit during the seed celling, comprising additional spring means entering into cooperation with the jaws as the latter present the fruit to the seed cell removing device.

11. The combination with a seed cell removing device, of spring pressed holding jaws movable to carry fruit to the seed cell removing device, and additional spring means with which said jaws engage for imposing greater pressure upon the fruit in the jaws while the seed cell removing device is operating upon the fruit.

12. The combination with a seed cell removing device, of holding means for carrying fruit to the seed cell removing device and holding it during the seed celling, and means for creating greater pressure of the holding means upon the fruit while said fruit is being operated upon by the seed cell removing device.

13. The combination with a seed cell removing device and a slicing device, of holding means for holding the fruit while the seed cell removing device is operating thereon, and a guide to which the fruit is delivered by the holding means for directing the fruit to the slicing device.

14. The combination with a seed cell removing device and a slicing device, of holding means for holding the fruit during the operation thereon of the seed cell removing device, and a guide rod leading to the slicing device and having the seed celled fruit delivered thereto by the holding device.

15. The combination with a seed cell removing device and a slicing device, of a holding means moving upwardly toward the seed cell removing device for holding the fruit during the seed celling thereof and a guide leading to the slicing device and movable beneath the holding means while the latter cooperates with the seed cell removing device so that the seed celled fruit after the seed celling may be placed upon said guide by said holding means.

16. The combination with a seed cell removing device and a slicing device, of a movable carrier having an apple holding device thereon, a holding mechanism for removing the fruit from the holding devices on the endless carrier and presenting it to the seed cell removing device, and a movable guide leading to the slicing device and having a portion movable to receive the seed celled fruit from the holding mechanism after such fruit has been seed celled.

17. The combination with a seed cell removing device and a slicing device pivotally mounted, of holding means for holding the fruit while it is being seed celled by the seed cell removing device, and a guide rigidly secured to the slicing device to swing therewith to a position where it may receive the fruit from the holding means to direct such fruit to the slicing device.

18. The combination with a seed cell removing device and a slicing device pivotally mounted, of holding means for holding the fruit while it is being seed celled by the seed cell removing device, a guide rigidly secured to the slicing device to swing therewith to a position where it may receive the fruit from the holding means to direct such fruit to the slicing device, and a pressure device for cooperating with the fruit on the guide to force the fruit through the slicing device.

19. The combination with a seed cell removing device and a slicing device pivotally mounted, of holding means for holding the fruit while it is being seed celled by the seed cell removing device, a guide rigidly secured to the slicing device to swing therewith to a position where it may receive the fruit from the holding means to direct such fruit to the slicing device, and a pressure device for cooperating with the fruit on the guide to force the fruit through the slicing device, said pressure device having a slot which permits the pressure device to straddle the guide.

20. The combination with a seed cell removing device rotatable about an axis, of holding means movable vertically toward and from the seed cell removing device, and when in its upper position holding the fruit in the position to be seed celled by the seed cell removing device, a movable carrier having a fruit holding device thereon from which the fruit is removed by the holding means, a pivotally mounted slicing device positioned below the seed cell removing device and having a rigid guide extending therefrom upwardly to move with said slicing device, and means for moving the guide and the slicing device to cause the upper end of the guide to receive seed celled fruit from the holding means after the seed cell removing device has operated upon such fruit.

21. The combination with a seed cell removing device rotatable about an axis, of holding means movable vertically toward and from the seed cell removing device, and when in its upper position holding the fruit in the position to be seed celled by the seed cell removing device, a movable carrier having a fruit holding device thereon from which the fruit is removed by the holding means, a pivotally mounted slicing device positioned below the seed cell removing device and having a rigid guide extending therefrom upwardly to move with said slicing device, and means for moving the guide and the slicing device to cause the upper end of the guide to receive seed celled fruit from the holding means after the seed celled removing device has operated upon such fruit, and a pressure device moving with said holding means to force the fruit on the guide through the slicing device.

22. The combination with a slicing device embodying a plurality of radially arranged blades and a guide rod extending centrally from said slicing device and having a laterally deflected portion whereby the fruit may be fed to the slicing device from a position to one side of the slicing device, and a pressure device for forcing the fruit through the slicing device having a slot through which the guide may pass.

23. The combination with a rotary seed cell removing knife movable inwardly and outwardly with reference to the axis of turning of the knife, of centering and holding jaws movable toward and from said seed cell removing knife in line with the axis of turning of said knife, and a device formed to penetrate an apple and movable into and out of alignment with the axis of turning of the rotary seed cell removing knife, so that the holding jaws may move in straight lines from said device to the seed cell removing knife and vice versa.

24. The combination with a slicing device, of a guide rod extending from said slicing device and provided with a bend therein deflecting the receiving end of said guide, and a pressure member movable in straight lines toward and from the slicing device and provided with a slot in which the guide rod is received, permitting the pressure device to move to one side of the rod at the bend, so that an apple may be fed on the rod to the slicing device below the pressure device.

25. A holding mechanism for fruit embodying two jaws pivoted to swing on different centers, a connecting means between the two jaws to cause them to move together, and separate spring means operating on the two jaws, one of the spring means having greater power than the other so as to take up wear or slack in the connection between the jaws, in order to maintain their proper centered relation.

26. A holding mechanism for fruit comprising two jaws mounted to swing on two different centers, a connection between the jaws causing them to move toward and from each other simultaneously, and two separate spring means one for each jaw, the spring means on one jaw being connected closer to the center of turning of such jaw than the spring means on the other jaw, so that one spring means has greater power than the other in order to take up for wear or looseness in the connection between the jaws whereby the centered relation between the jaws is maintained.

27. The combination with a seed cell removing knife and holding means for holding an apple in cooperation with the seed cell removing knife, one of said elements being rotatable about a suitable axis during the seed celling operation, and the knife being movable inwardly and outwardly with reference to said axis of rotation, of means controlled by the size of an apple in the holding means coacting with means controlling the position of said knife for determining the distance the seed cell removing knife will operate outwardly with reference to said axis.

28. The combination with a seed cell removing knife and a holding means for holding an apple in cooperative relation with the knife during seed celling, one of said elements being rotatable about an axis during the seed celling and the seed cell removing knife being movable inwardly and outwardly with reference to said axis, of spring means normally tending to move said seed celling removing knife in one direction, and means associated with the holding means and acting against the spring means to effect the movement of the knife in the opposite direction.

29. The combination with a seed cell removing knife and centering and holding jaws for holding an apple in cooperation with the seed cell removing knife, the jaws and the knife being relatively movable about a suitable axis during the seed celling operation, and the knife being movable inwardly and outwardly with reference to said axis of rotation, of spring means normally tending to move said seed cell removing knife to its inner position, and means on the holding jaws acting against said spring means to effect the movement of the knife outwardly as the jaws present the fruit to the knife.

30. The combination with a seed cell removing knife and holding means for holding an apple in cooperative relation with the seed cell removing knife during seed celling, said holding means being movable to carry an apple to the seed cell removing knife, and said knife and holding means being relatively movable about a suitable axis, the knife being movable outwardly and inwardly with reference to the axis of rotation, of spring means acting on the knife to move the latter inwardly, and means carried by the holding means and acting against the spring of the knife for moving the knife outwardly an amount proportional to the size of the apple in the holding means.

31. The combination with a seed cell removing knife and a holding means for holding an apple in cooperative relation with the knife during seed celling, said holding means being movable to carry the apple to the seed cell removing knife, the knife and the holding means being relatively movable about a suitable axis, and the knife being movable outwardly with reference to said axis, of means for effecting the movement of the knife outwardly an amount proportional to the size of the apple in the holding means.

32. The combination with a seed cell removing knife and relatively movable jaws for holding an apple in cooperative relation to a knife during seed celling, the knife and the jaws being relatively movable about a suitable axis, and the knife being movable inwardly and outwardly with reference to the suitable axis, of spring means normally tending to hold the knife in its inner position, and means carried by the relatively movable jaws for cooperating with the spring means so that the spring means of the seed cell removing knife acts to increase the holding action of the jaws on the fruit.

BURTON C. COONS.